US012666238B2

(12) United States Patent
Allen

(10) Patent No.: US 12,666,238 B2
(45) Date of Patent: Jun. 23, 2026

(54) VIDEO IN SUPPORT OF EMERGENCY SERVICES CALL LOCATION DATA

(71) Applicant: 911Inform LLC, Wall Township, NJ (US)

(72) Inventor: Ivo Allen, Freehold, NJ (US)

(73) Assignee: 911Inform LLC, Wall Township, NJ (US)

( * ) Notice: Subject to any disclaimer, the term of this patent is extended or adjusted under 35 U.S.C. 154(b) by 413 days.

(21) Appl. No.: 18/080,538

(22) Filed: Dec. 13, 2022

(65) Prior Publication Data

US 2023/0199462 A1    Jun. 22, 2023

Related U.S. Application Data

(60) Provisional application No. 63/291,705, filed on Dec. 20, 2021, provisional application No. 63/291,671, filed on Dec. 20, 2021.

(51) Int. Cl.
| | |
|---|---|
| *H04W 4/90* | (2018.01) |
| *H04N 7/18* | (2006.01) |
| *H04W 4/021* | (2018.01) |
| *H04W 4/029* | (2018.01) |

(52) U.S. Cl.
CPC .............. *H04W 4/90* (2018.02); *H04N 7/181* (2013.01); *H04W 4/021* (2013.01); *H04W 4/029* (2018.02)

(58) Field of Classification Search
CPC ....... H04W 4/90; H04W 4/021; H04W 4/029; H04N 7/18
See application file for complete search history.

(56) References Cited

U.S. PATENT DOCUMENTS

| | | | |
|---|---|---|---|
| 6,243,442 B1 | 6/2001 | Tanaka et al. | |
| 7,420,963 B1 | 9/2008 | Shankar et al. | |
| 12,323,895 B2 | 6/2025 | Allen | |
| 2006/0282302 A1 | 12/2006 | Hussain | |
| 2009/0291663 A1 | 11/2009 | Schultz et al. | |
| 2018/0199179 A1* | 7/2018 | Rauner ................. | G08B 25/10 |
| 2019/0082477 A1 | 3/2019 | Burton et al. | |
| 2023/0056155 A1* | 2/2023 | Fukuda ................. | G06F 16/784 |
| 2023/0199461 A1 | 6/2023 | Allen | |

OTHER PUBLICATIONS

Notice of Allowance in U.S. Appl. No. 18/080,526 dated Jul. 21, 2025.

* cited by examiner

*Primary Examiner* — Marcos L Torres
(74) *Attorney, Agent, or Firm* — Morse, Barnes-Brown & Pendleton PC; Sean D. Detweiler, Esq.

(57) ABSTRACT

A technological solution herein enables the supply of surveillance video corresponding to an enhanced geospatial location of an emergency service call request corresponding with the live call. Geofenced areas are established at sites corresponding to a camera view of the remotely accessible surveillance video at the site. The technological solution makes available the accessible surveillance video for sites, which is maintained in a database that can be accessed to provide enhanced location data for an emergency call as it happens. The location and video are provided to first responders or other emergency services providers at the time of the call requesting emergency services. The system and method include access to the surveillance video whenever the location of the emergency call request overlaps with a geofenced area maintained by the system and method, thereby providing first responders with additional valuable information as to what is occurring at the site.

19 Claims, 9 Drawing Sheets

100

ALI Display

Retransmit | Options

Calling Number:

ESN=575
(973) 826-9111    07 : 45   10/13/2020
1704 RT 34 E
OOOOOOOOOOOOOOOOOOOOOOOOOOOOOO
                826-9111      BUSN
                              NJ   20 - 30 CHARS AVAILABLE
                                   FOR LINE 2 TEXT SHOWN

WALL
911 INFORM, LLC
ALT#              TELCO=VZ
X= . 000000       CNF=0
Y= . 000000       s=000 D=000

POLICE =  WALL TWP PD
FIRE    =  WALL FIRE RESCUE
EMS     =  AMR MEDICAL EMS

102

104

300

302 — Register one or more sites

304 — Establish one or more geofenced areas associated with one or more sites

306 — Receive request for enhanced location data for emergency caller

308 — Provide enhanced location data including video when location of caller overlaps a geofenced area

700

VIDEO IN SUPPORT OF EMERGENCY SERVICES CALL LOCATION DATA

CROSS-REFERENCE TO RELATED APPLICATION(S)

This application claims priority to, and the benefit of, U.S. Provisional Application No. 63/291,671, filed Dec. 20, 2021, and U.S. Provisional Application No. 63/291,705, filed Dec. 20, 2021, for all subject matter contained in said applications. The disclosures of said provisional applications are hereby incorporated by reference in their entirety.

FIELD OF THE INVENTION

The present invention relates to methods and systems for providing enhanced location data for emergency services calls, such as 911 calls in North America. In particular, the present invention is directed to providing video in support of location data for emergency services calls.

BACKGROUND

The current system for providing emergency services caller information is limited. E911 (Enhanced 911) is the 911 network functionality available today in North America with equivalent services in other countries. E911 provides two basic lines of location information to the public-safety answering point (PSAP), which is a call center where emergency calls (like police, fire brigade, ambulance) are initiated by any mobile or landline subscriber are received. The PSAP is shown in the example data screen 100 of FIG. 1. The first is Line 1 data 102 and consists of the basic address associated with the specific phone number. The secondary Line 2 information 104 is the data a first responder can use to identify a specific location beyond the basic address, allowing them to locate the emergency. Line 2 data 104 is limited to 20 ASCII characters of information and is the information that can be updated to provide additional information. In many cases, these updates can take anywhere from 24-48 hours to go live in the PSAP.

In many emergency call situations, is beneficial for the first responders, to have as much information about the location of the emergency call as possible. If the location of the emergency call is a site, the first responder would benefit from having a floor plan and room designation for the call. With a conventional system, the first responder must make additional inquiries or arrangements outside of the information provided as part of the emergency call response. For example, to gather all the information about the location, the first responders have to get in contact with the building owner or municipality to obtain floor plans of the building. This can cause increased delays and present unnecessary danger for victims and first responders while waiting for maps or floorplans or proceeding without the floorplan information.

Increasingly, buildings and institutions also have video surveillance of the location. First responders also greatly benefit from having access to surveillance video of the location. However, getting access to the surveillance video presents much the same issues as obtaining a map or floorplan. Typically, access to the surveillance video is controlled by security at the location, which may or may not be able to provide access to the video external to the security facility at the location. Thus, first responders need to make inquiries regarding whether video at the location exists and then whether it can be accessed. Again, making inquiries and acquiring the information costs the first responder valuable time, but operating without such information can present unnecessary danger to the first responder.

The inefficiency of emergency call-handling technology to provide complete and useful location information, and account for the increased amount of available security video, presents a problem for first responders responding to an emergency call. Increased delays and unnecessary danger for victims and first responders can result from waiting for additional location information, such as surveillance video, or can result in the first responders proceeding without the additional information and entering potentially dangerous situations or environments blind.

SUMMARY

There is a need for a technological improvement in the form of a system and method that is capable of providing accurate and useful geospatial physical location information for emergency call first responders including providing surveillance video from the location of the emergency call during the emergency call. The present invention is directed toward further solutions to address this need, in addition to having other desirable characteristics. Specifically, the system and method of the present invention provide a technological solution for establishing whether surveillance video is available for a geospatial physical location and is quickly accessible. The solution further enables access to the accessible surveillance video in response to a location information inquiry for an emergency call.

In accordance with example embodiments of the present invention, a system for providing video in support of emergency call location data is disclosed. The system includes a server configured to establish one or more geofenced areas associated with one or more location sites having remotely accessible surveillance video where a geofenced area corresponds to a camera view of the remotely accessible surveillance video; receive a request for geospatial physical location data for an emergency caller; and when the geospatial physical location of the emergency caller positionally overlaps the one or more established geofenced areas, provide access to the surveillance video and output the geospatial physical location of the caller corresponding with the geofenced area.

In accordance with aspects of the present invention, the remotely accessible surveillance video is a security video of the geospatial physical location.

In accordance with aspects of the present invention, the remotely accessible surveillance video is provided by an IP camera.

In accordance with aspects of the present invention, the one or more location sites comprise a building or grounds.

In accordance with aspects of the present invention, providing access to the surveillance video and outputting the geospatial physical location of the caller corresponding with the geofenced area comprises providing a link to the accessible surveillance video. In other aspects, providing access to the surveillance video and outputting the geospatial physical location of the caller corresponding with the geofenced area comprise providing a pop open camera view.

In accordance with aspects of the present invention, providing the geospatial physical location of the caller further includes providing a map of the geospatial physical location. In some such aspects, access to the surveillance video is provided as selectable icons or links on the map. In other aspects, providing the geospatial physical location of the caller further comprises providing an altitude of the caller. In still other aspects, providing the geospatial physical location of the caller further comprises providing a room within a building/facility the caller is located.

In accordance with aspects of the present invention, the server is further configured to register one or more geospatial physical location sites.

In accordance with example embodiments of the present invention, a system for providing video in support of emergency call location data is disclosed. The system includes an emergency call routing service and an enhanced geospatial physical location service provider. The emergency call routing service is configured to receive, process, and route emergency calls. The enhanced geospatial physical location service provider is in communication with the emergency call routing service. The enhanced location service provided is configured to establish one or more geofenced areas associated with one or more geospatial physical location sites having remotely accessible surveillance video where a geofenced area corresponds to a camera view of the remotely accessible surveillance video; receive a request for geospatial physical location data for an emergency caller from the emergency call routing service; and when the geospatial physical location of the emergency caller positionally overlaps the one or more established geofenced areas, provide access to the surveillance video and output the geospatial physical location of the caller corresponding with the geofenced area.

In accordance with example embodiments of the present invention, a method for providing video in support of emergency call location data is disclosed. The method involves establishing one or more geofenced areas associated with one or more location sites having remotely accessible surveillance video where a geofenced area corresponds to a camera view of the remotely accessible surveillance video; receiving a request for geospatial physical location data for an emergency caller; and when the geospatial physical location of the emergency caller positionally overlaps the one or more established geofenced areas, providing access to the surveillance video and outputting the geospatial location of the caller corresponding with the geofenced area.

In accordance with aspects of the present invention, the remotely accessible surveillance video is a security video of the geospatial physical location. In other aspects, the remotely accessible surveillance video is provided by an IP camera.

In accordance with aspects of the present invention, the one more geospatial physical location sites comprise a building or grounds.

In accordance with aspects of the present invention, providing access to the surveillance video and outputting the geospatial physical location of the caller corresponding with the geofenced area comprises providing a link to the accessible surveillance video. In other aspects, providing access to the surveillance video and outputting the geospatial physical location of the caller corresponding with the geofenced area comprise providing a pop open camera view. In some such aspects, providing the geospatial physical location of the caller further includes providing a map of the geospatial physical location. In certain such aspects, access to the surveillance video is provided as selectable icons or links on the map.

In accordance with aspects of the present invention, providing the geospatial physical location of the caller further comprises providing an altitude of the caller. In other aspects, providing the geospatial physical location of the caller further comprises providing a room within a building/facility the caller is located.

In accordance with aspects of the present invention, the method further involves registering one or more geospatial physical location sites.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
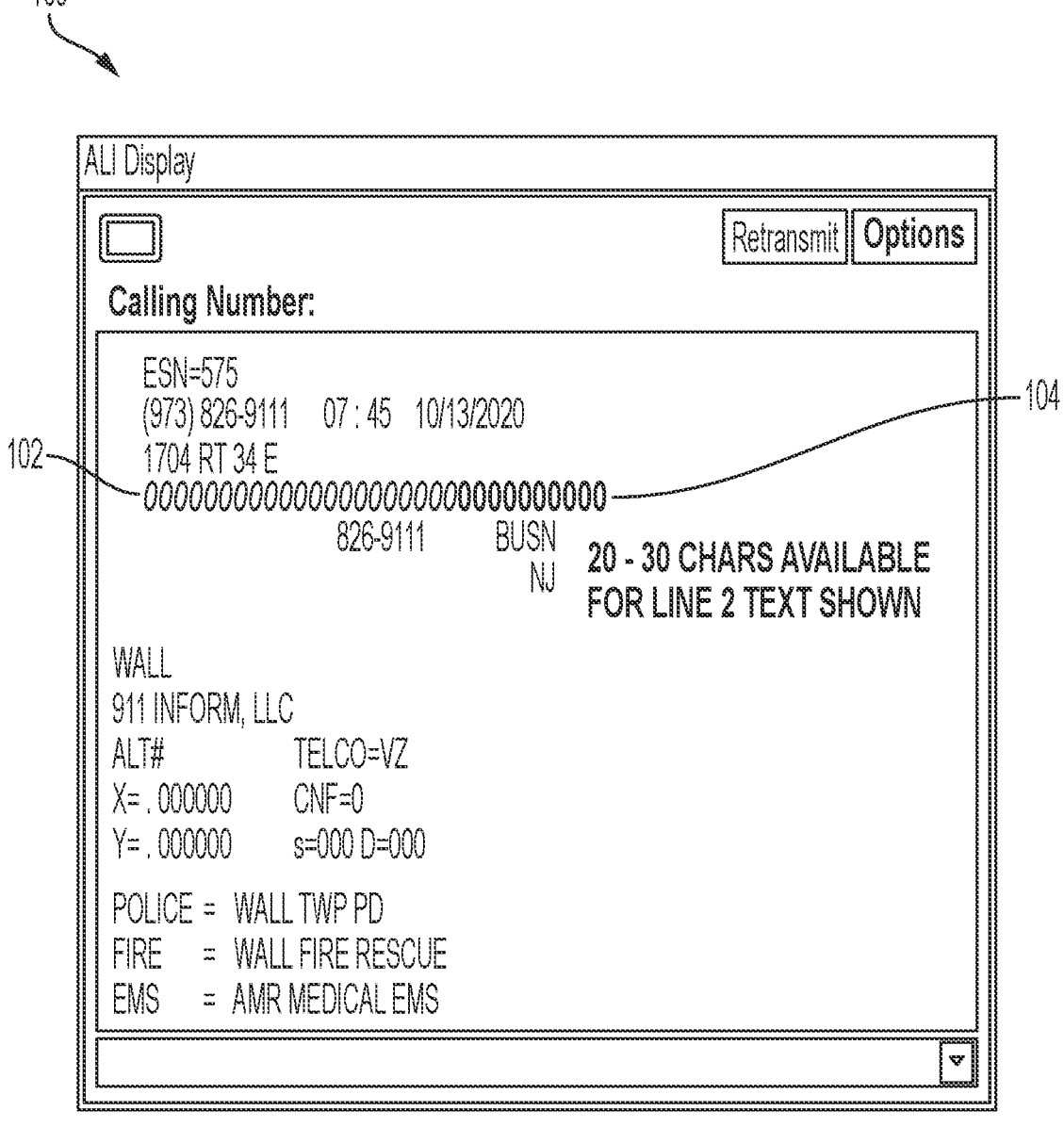
FIG. 1 is an example of a data screen provided by conventional emergency call processing.

An illustrative embodiment of the present invention relates to a technological solution to the problem of inefficient emergency response systems by providing a system and method for providing surveillance video in support of geospatial physical location information for emergency services calls. The system and method establish geofenced areas at sites that correspond to a camera view of the remotely accessible surveillance video at the site. The availability of the accessible surveillance video for sites is maintained in a database which can then be queried or otherwise consulted to provide enhanced geospatial physical location data for an emergency call. including access to surveillance video if a location of an emergency caller overlaps with a geofenced area with an appropriately positioned camera.

FIG. 2 through FIG. 9 wherein like parts are designated by like reference numerals throughout, illustrate an example embodiment or embodiments of the system and a methodology, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, configuration, or type of elements or materials, in a manner still in keeping with the spirit and scope of the present invention.

Figure 2:
FIG. 2 is an example system for providing surveillance video from a location in support of emergency call processing in accordance with embodiments of the present invention.
Figure 2:
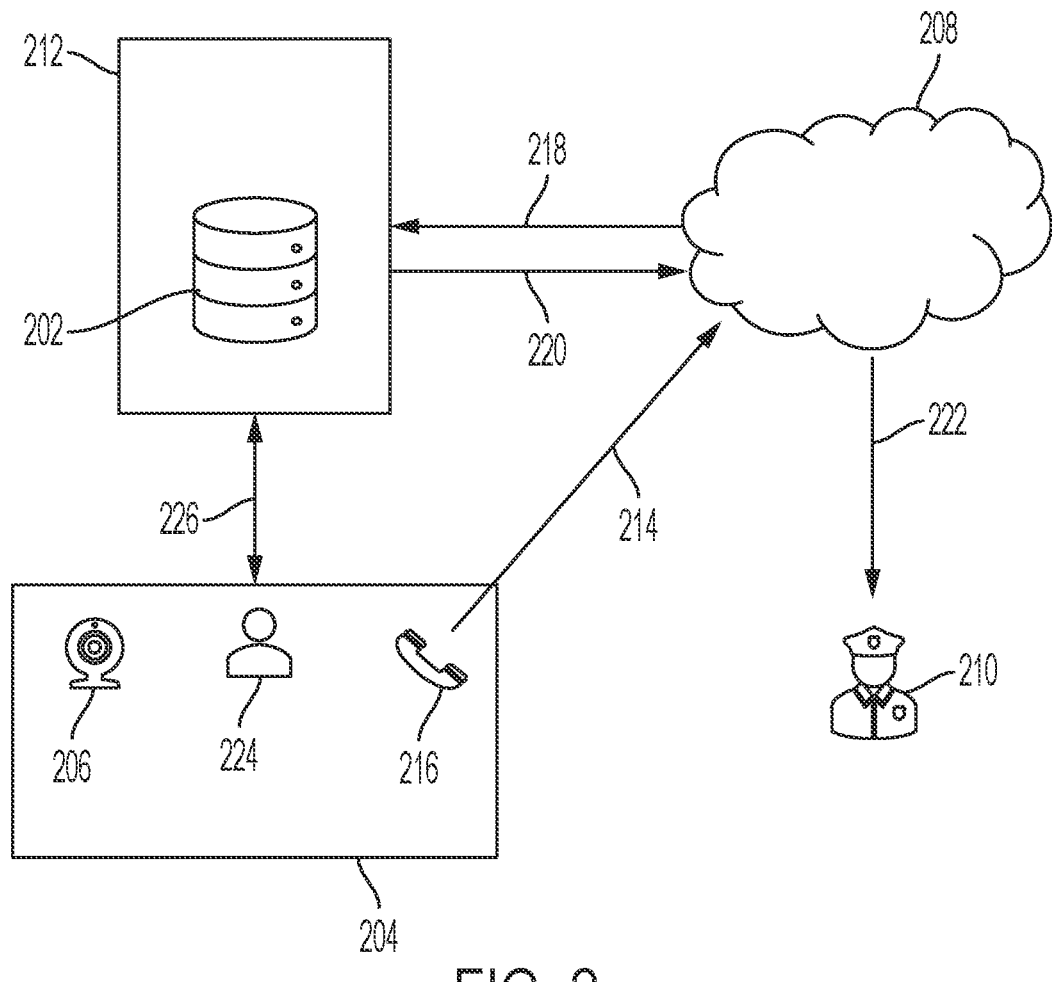

FIG. 2 depicts an example system 200 for implementing the present invention. The system 200 makes use of a location database 202 that stores enhanced geospatial physical location data associated with sites 204 including whether there is accessible surveillance video 206 at a site 204 location. The system 200 also includes an emergency call routing service 208 in communication with the database 202 that receives incoming emergency calls and provides the enhanced geospatial physical location data (including accessible surveillance video) from the database 202 to an appropriate emergency responder 210.

In this embodiment, the location database 202 is provided by an enhanced location service provider 212 in communication with the emergency call routing service 208. This service provider 212 can be a server located remotely or be cloud-based. In this embodiment, the one or more client sites 204 are registered with the location service provider 212. The client site 204 may be a building, campus, grounds, or facility.

When the emergency call routing service 208 receives an emergency call 214 from a caller 216, a determination of the geospatial physical location of the caller 216 is made. As part of that process, the emergency call routing service 208 can request 218 enhanced geospatial physical location data from the enhanced location service provider 212. The location service provider 212, in turn, provides enhanced geospatial physical location data 220 in response to the request 218. If the geospatial physical location of the caller 216 is determined to fall within a site 204 registered with the enhanced location service provider 212 the enhanced geospatial physical location data 220 can include access to available surveillance video 206 at the site 204. The enhanced geospatial physical location data 220 in turn can be provided as part of the data 222 provided to the appropriate first responder 210.

Figure 3:
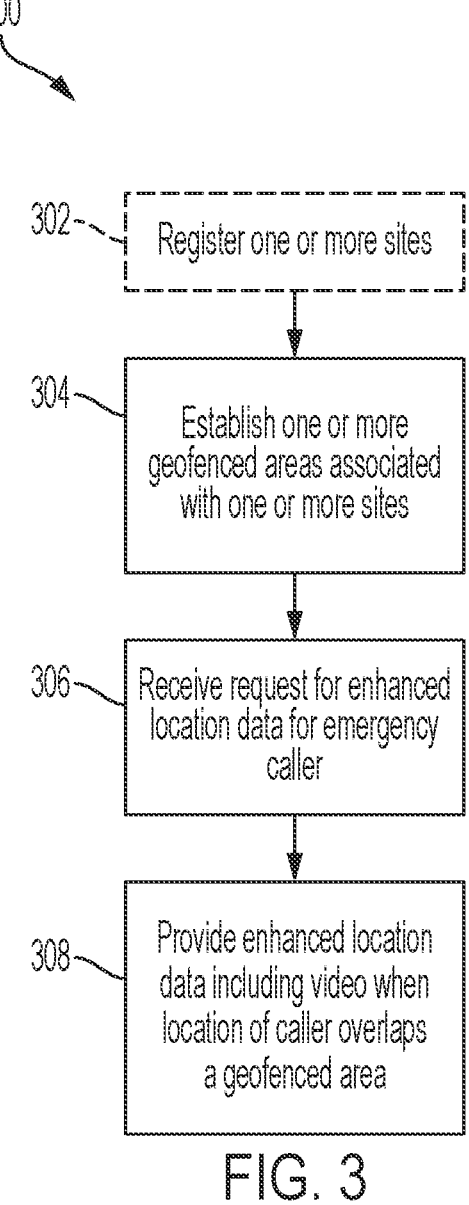
FIG. 3 is an example method for providing surveillance video from a location in support of emergency call processing in accordance with embodiments of the present invention.

An example of how the components of FIG. 2 interact can be seen in FIG. 3 FIG. 3 is a high-level methodology 300 for providing enhanced geospatial physical location data for emergency calls including access to any available surveillance video at the site 204.

Referring now to the method 300 of FIG. 3, In certain embodiments, one or more sites 204 are registered with the enhanced location service provider 212 (Step 302). Then one or more geofenced areas associated with one or more sites 204 having remotely accessible surveillance video are established (Step 304). A geofenced area corresponds to a camera view of the remotely accessible surveillance video 206. The method then proceeds when a request 218 for enhanced geospatial physical location data for an emergency call from a caller 216 is received (Step 306). The enhanced geospatial physical location data 220 stored in the maintained database 202 associated with the caller 216 is then output in response to the request (Step 308). When the geospatial physical location of the caller 216 overlaps a geofenced area, then the output enhanced geospatial physical location data 220 includes access to the remotely accessible surveillance video 206.

The enhanced geospatial physical location data can include one or more of a country indication, a state indication, a street address, a map, a floor designation, a room designation, and a floorplan indication. In certain embodiments, an elevation or altitude can be provided, where a positive altitude is above sea-level and a negative altitude is below sea-level. Altitude may be relayed to users of the system by correlating floor or other appropriate indicator. An example of such a floorplan 400 can be seen in FIG. 4. Here an example screenshot is depicted. It should be noted that the text and icons presented in this floorplan 400 are merely illustrative of what can be displayed. The actual format and text can vary, thus the specific characters displayed in the screenshots are not directly relevant to the understanding of the invention. The enhanced geospatial physical location data can also include points of entrance or egress (doors/windows/fire escapes), fire/emergency resources, entry routes, escape routes, etc. If there is remotely accessible surveillance video 206 at the site 204, access to the remotely accessible surveillance video 206 is also provided as part of the enhanced geospatial physical location data.

Figure 4:
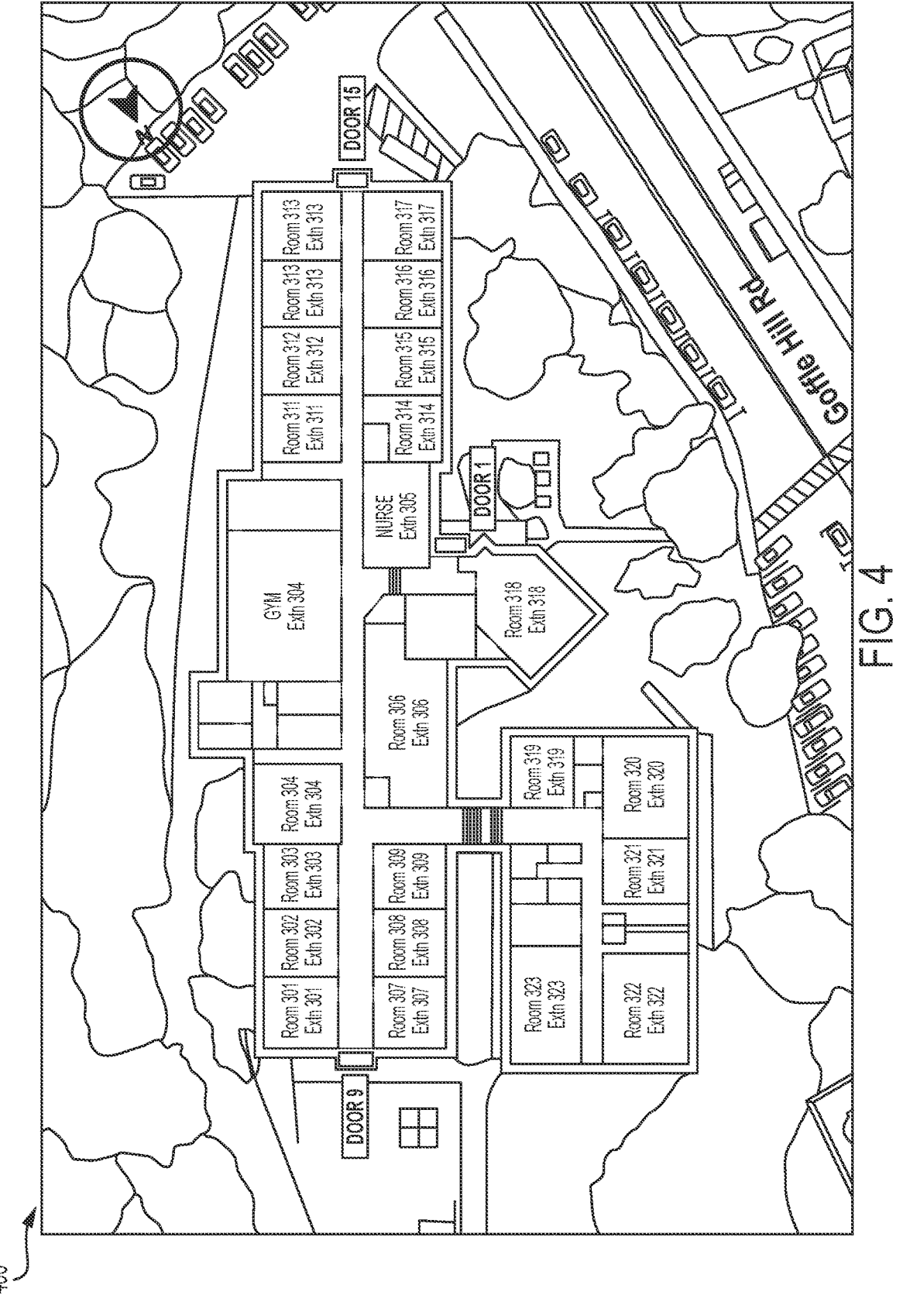
FIG. 4 is an example screenshot of location data that can be stored in the location database when a site location is registered with the enhanced location service provider in accordance with embodiments of the present invention.

Access to remotely accessible surveillance video can be provided if the caller 216 is identified as being located at a site 204 registered with the enhanced location service provider 212. In registering a site 204, a user 224, such as a site 204 owner or manager, provides information regarding the site 204 for the database 202, such as name, location, etc. In certain embodiments, the user (or their organization with which they are in some way associated, or the manager of the site 204) may submit a map or floorplan, such as seen in FIG. 4. In other embodiments, the enhanced location service provider 212 generates or otherwise obtains a map based on the information provided by the user 224. The interaction 226 between the enhanced location service provider 212 and the user 224 can be performed using a website, interface, or application operating on a personal computing device of the user 224.

If there is remotely accessible surveillance video 206 at the site 204, the user 224 is also provided with the ability to indicate its availability. The user 224 can specify the geospatial physical location and type of camera deployed. In certain embodiments, the camera(s) being used are IP camera(s). In such instances, the user can also specify the means for accessing the surveillance video of the camera(s), for example, a website or IP address for the camera(s). One way of performing this can be seen in FIG. 5. Here an example screenshot is depicted. It should be noted that the text and icons presented in this floorplan are merely illustrative of what can be displayed. The actual format and text can vary, thus the specific characters displayed in the screenshots are not directly relevant to the understanding of the invention.

Figure 5:
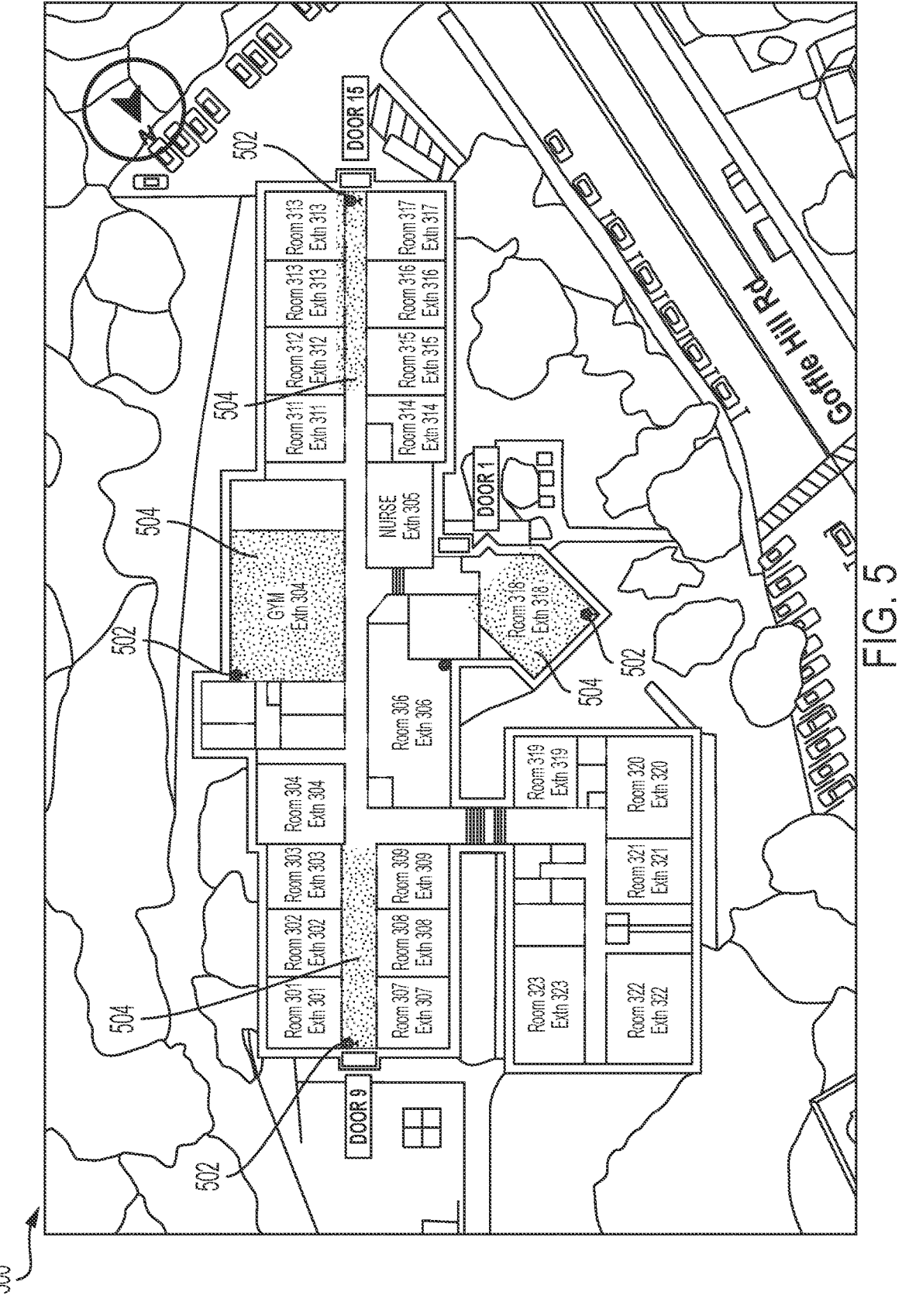
FIG. 5 is an example screenshot establishing geofenced areas corresponding to camera views at a location site in accordance with embodiments of the present invention.

In FIG. 5 an interactive version 500 of the floorplan 400 of FIG. 4 is provided to the user 224 registering the site 204. Using the interactive version 500, the user 224 can place camera icons 502 or links representing cameras located at the actual physical site 204 geospatial location. Geofenced areas 504 can then be established at the site 204 (Step 304). A geofenced area 504 corresponds to a camera view of a remotely accessible surveillance video 206 as indicated by the camera icon 502. In certain embodiments, the area of a geofenced area 504 is defined by the user 224. In other embodiments, the area of a geofenced area is based on the camera used (as specified by the user 224) and the dimensions of the space the camera is deployed in. This process can then be repeated as necessary for each site 204 being registered.

With the one or more sites 204 registered (Step 302) and one or more geofenced areas associated with the one or more sites 204 established (Step 304), when a request for enhanced geospatial physical location data is received by the enhanced location service provider 212 (Step 306) from an emergency call routing service 208 for a caller 216, if the geospatial physical location of the caller 216 positionally overlaps the one or more established geofenced area 504, then the access to the surveillance video 206 is provided along with the other enhanced location data for the caller 216 (Step 308). An example of such provided enhanced geospatial physical location data can be seen in FIG. 6. Here an example screenshot is depicted. It should be noted that the text and icons presented in this floorplan are merely illustrative of what can be displayed. The actual format and text can vary, thus the specific characters displayed in the screenshots are not directly relevant to the understanding of the invention.

Figure 6:
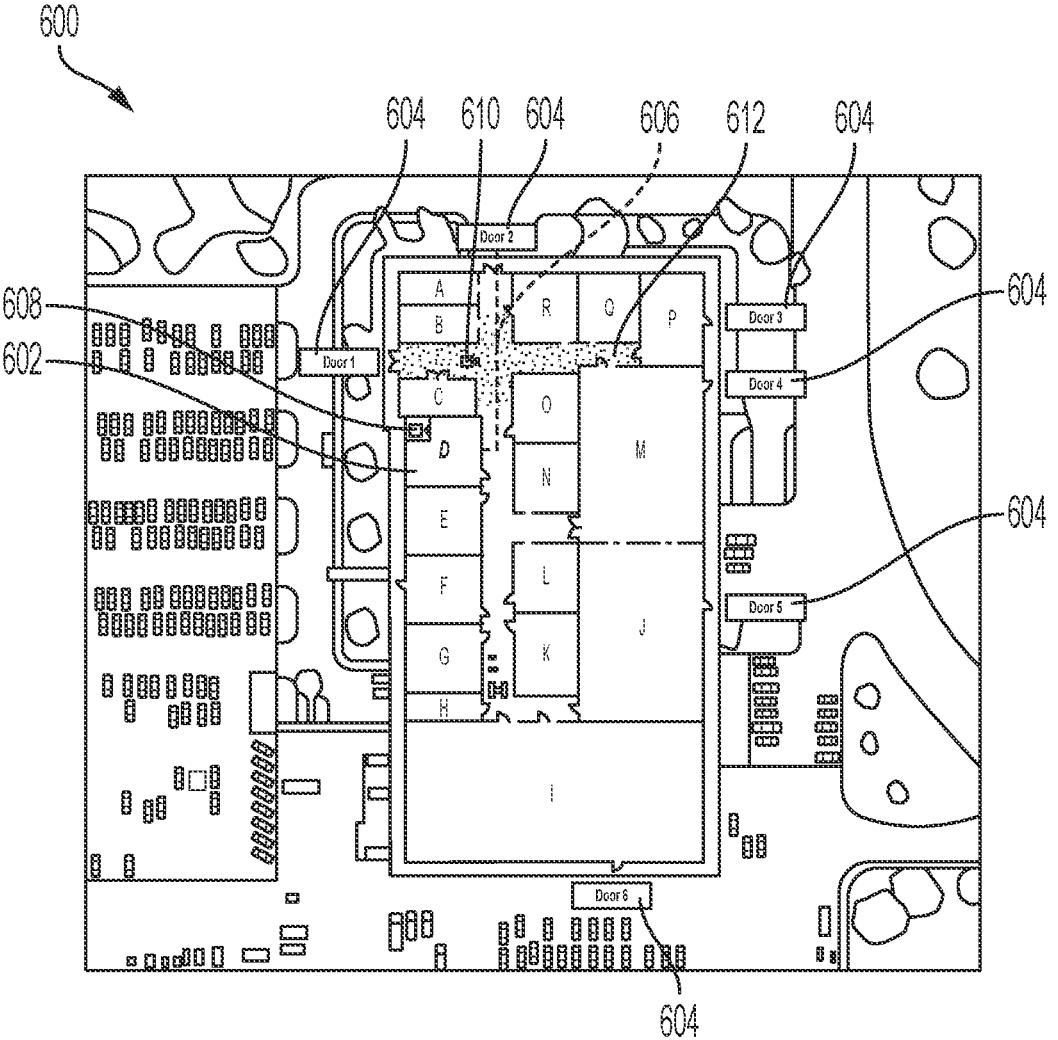
FIG. 6 is an example screenshot of enhanced geo spatial location data that can be provided by the location database in accordance with embodiments of the present invention.
Figure 7:
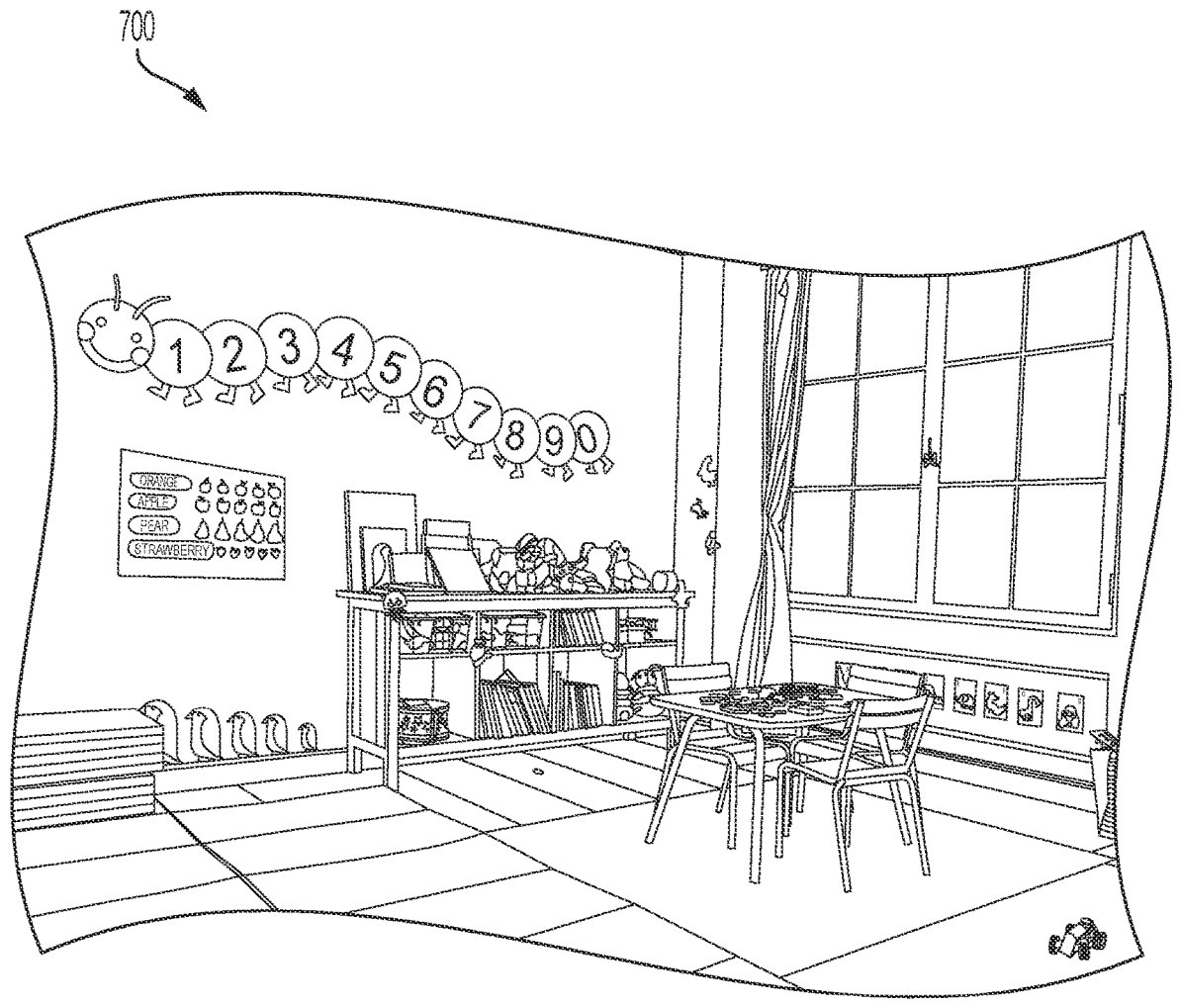
FIG. 7 is an example view of a room covered by a geofenced area in accordance with embodiments of the present invention
Figure 8:
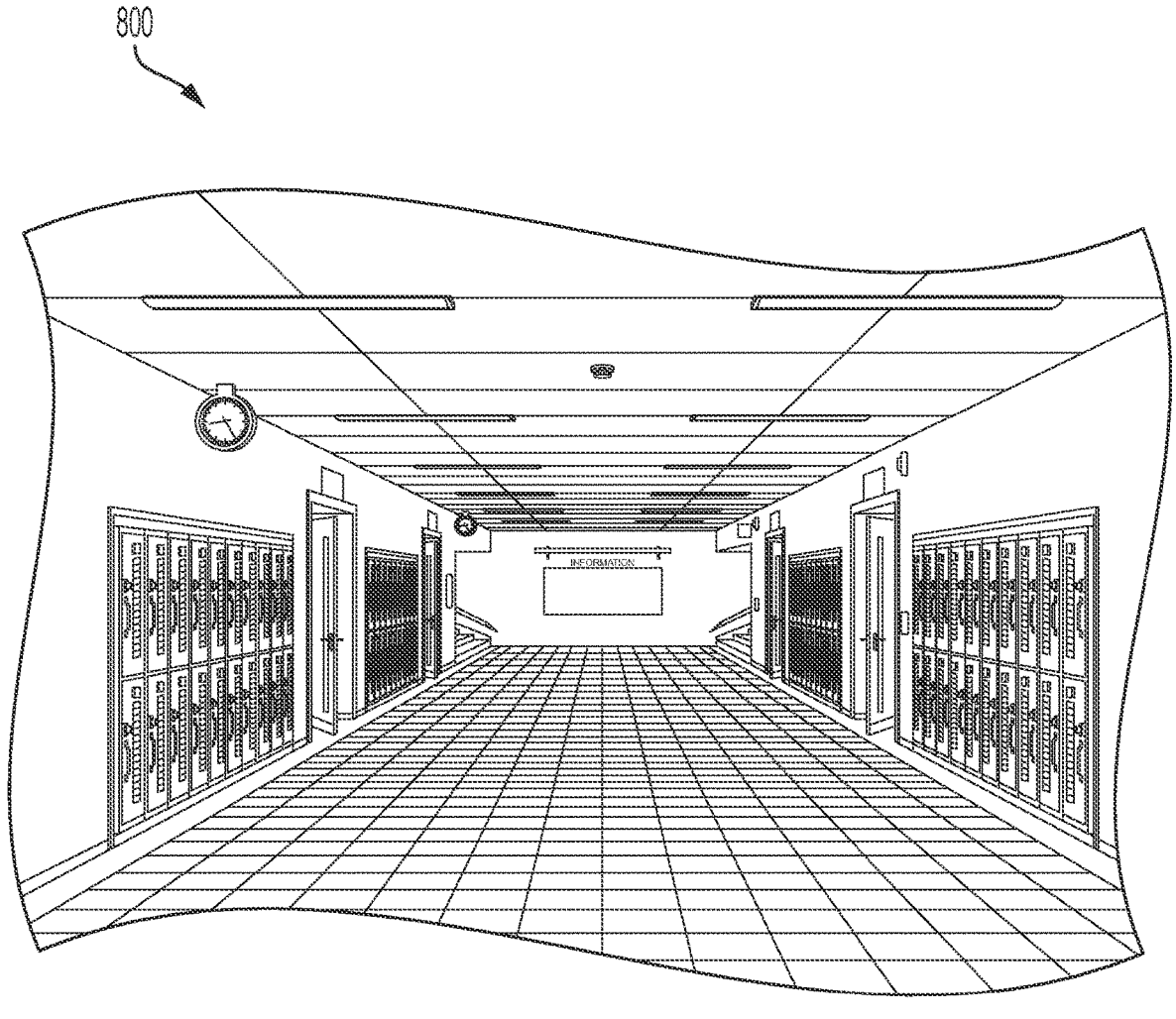
FIG. 8 is an is an example view of a hallway covered by another geofenced area in accordance with embodiments of the present invention.

FIG. 6 depicts an example of enhanced geospatial physical location data outputted 220 by the enhanced location service provider 212 or provided 222 to the first responder 210 for a site 204. Here the enhanced geospatial physical location data comprised an interactive map, in this case, a floorplan 600. In this embodiment, the floorplan 600 includes the geospatial physical location of the caller 216 (602), an indication of access points to the facility (Doors 604), a preferred path for access/egress for the caller 216 (606). Locations of cameras at the site 204 are also provided. There is a camera (608) in the same room (602) as the caller 216 where the corresponding geofenced area is the room (602) containing the camera (608). An example of the surveillance video 700 provided by this camera (608) can be seen in FIG. 7. Another camera (610) is provided in the hallway. The geofenced area corresponding to this camera is indicated by area 612. An example of the surveillance video 800 provided by this camera (610) can be seen in FIG. 8. In certain embodiments, the surveillance video 700, 800 of the cameras 608, 610 can be accessed by clicking on or otherwise selecting the camera icons 608, 610 in the interactive map floorplan 600. In other embodiments the surveillance video 700, 800 automatically appears or pops open in a window when the geospatial physical location of the caller 216 overlaps an established geofenced area.

In certain embodiments, the location service provider 212 can provide additional functionality. For example, the location service provider can send a notification to security personal at the geospatial physical location of the emergency call.

Figure 9:
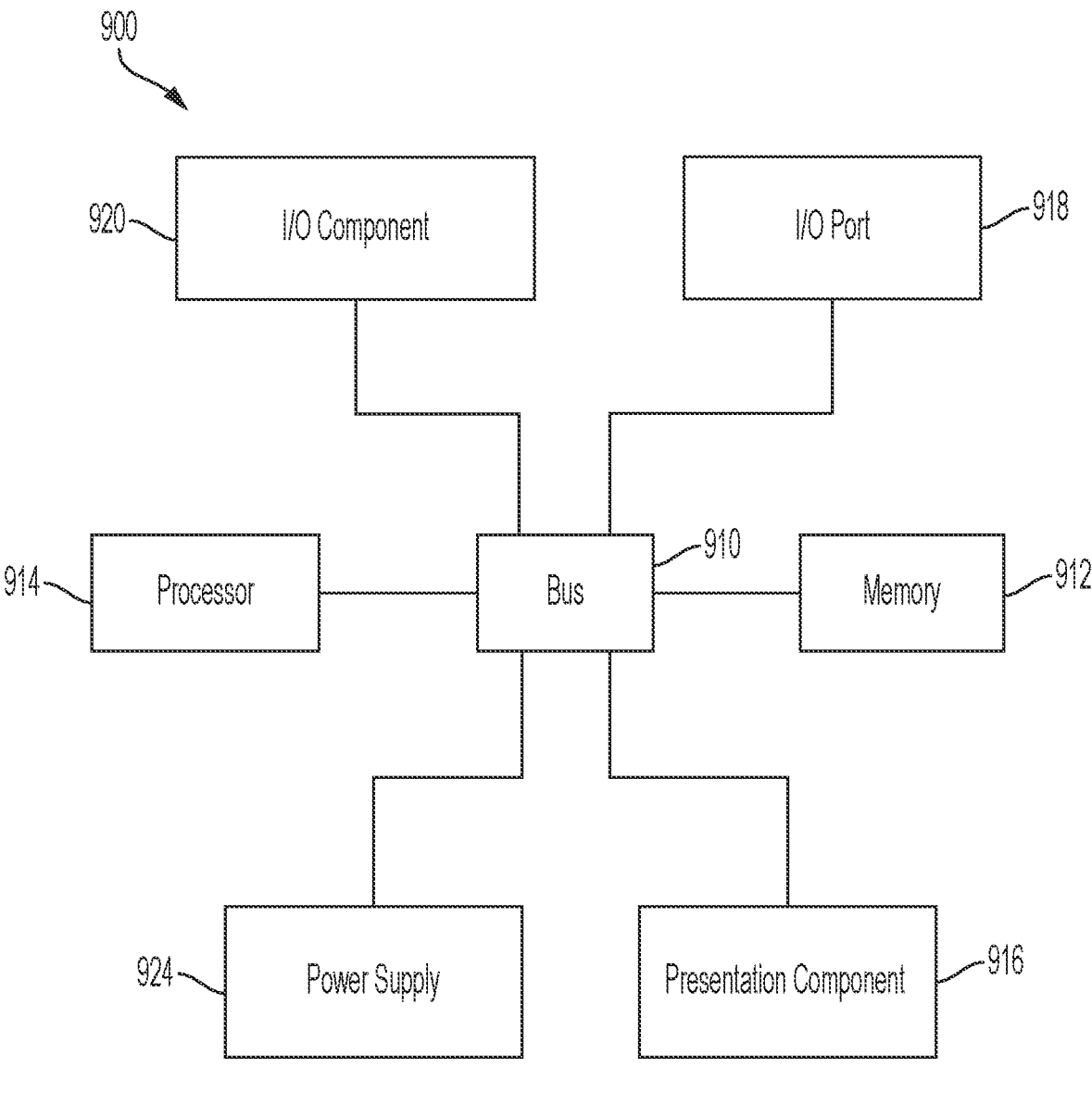
FIG. 9 is a diagrammatic illustration of a high-level architecture configured for implementing processes in accordance with aspects of the invention.

One illustrative example of a computing device 900 used to provide the functionality of the present invention, such as provided by the location database 202, location service provider 212, or a personal computing device of a user 224. The computing device 900 is merely an illustrative example of a suitable special-purpose computing environment and in no way limits the scope of the present invention. A "computing device," as represented by FIG. 9, can include a "workstation," a "server," a "laptop," a "desktop," a "handheld device," a "mobile device," a "tablet computer," or other computing devices, as would be understood by those of skill in the art. Given that the computing device 900 is depicted for illustrative purposes, embodiments of the present invention may utilize any number of computing devices 900 in any number of different ways to implement a single embodiment of the present invention. Accordingly, embodiments of the present invention are not limited to a single computing device 900, as would be appreciated by one with skill in the art, nor are they limited to a single type of implementation or configuration of the example computing device 900.

The computing device 900 can include a bus 910 that can be coupled to one or more of the following illustrative components, directly or indirectly: a memory 912, one or more processors 914, one or more presentation components 916, input/output ports 918, input/output components 920, and a power supply 924. One of skill in the art will appreciate that the bus 910 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 9 is merely illustrative of an exemplary computing device that can be used to implement one or more embodiments of the present invention, and in no way limits the invention.

The computing device 900 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 900.

The memory 912 can include computer-storage media in the form of volatile and/or nonvolatile memory. The memory 912 may be removable, non-removable, or any combination thereof. Exemplary hardware devices are devices such as hard drives, solid-state memory, optical-disc drives, and the like. The computing device 900 can include one or more processors 914 that read data from components such as the memory 912, the various I/O components 916, etc. Presentation component(s) 916 present data indications to a user or other device. Exemplary presentation components include a display device, speaker, printing component, vibrating component, etc.

The I/O ports 918 can enable the computing device 900 to be logically coupled to other devices, such as I/O components 920. Some of the I/O components 920 can be built into the computing device 900. Examples of such I/O components 920 include a camera 9 microphones, joystick, recording device, game pad, satellite dish, scanner, printer, wireless device, networking device, and the like.

The power supply 924 can include batteries. Other suitable power supply or batteries will be apparent to one skilled in the art given the benefit of this disclosure.

The disclosed embodiments of the present invention provide video in support of geospatial physical location data for emergency services calls. The system and method establish geofenced areas at sites that correspond to a camera view of the remotely accessible surveillance video at the site. The availability of the accessible surveillance video for sites is maintained in a database which can then be queried or otherwise consulted to provide enhanced geospatial physical location data for an emergency call including access to surveillance video if a geospatial physical location of an emergency caller overlaps with a geofenced area. Thus, the system provides enhanced geospatial physical location functionality as the geospatial physical location data including accessible video provided is more robust and readily available than what was previously provided in conjunction with emergency calls. The present invention provides the technology enabling a practical solution of providing first responders any other emergency workers with substantially more accurate geospatial location information pinpointing the exact origins of an emergency caller, and additionally provides the technology for feeding surveillance video corresponding to the geofenced location that is also the origin of the emergency call. With the technology of the present invention, the first responders and other emergency workers are transformed from having a general building address of an emergency caller, to a specific room or other enhanced geospatial location along with surveillance video of what is occurring at that call origin location. Prior technology of emergency call handling was incapable of providing this functionality. The enhanced geospatial location data provided by the present invention saves the first responder time and prevents unnecessary danger as the first responder does not have to separately obtain the floor plan and determine the availability of surveillance video at the site or proceed without the additional information and enter a potentially dangerous situation or environment blind.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A system for providing video in support of emergency call location data, the system comprising:
a server configured to:
establish one or more geofenced areas associated with one or more location sites having remotely accessible surveillance video where a geofenced area corresponds to a camera view of the remotely accessible surveillance video, wherein establishing one or more geofenced areas having remotely accessible surveillance video at a location site comprises:
providing an interactive map for the location site;
receiving placement of one or more selectable icons on the interactive map corresponding to a remotely accessible surveillance video; and
establishing a geofenced area corresponding to a camera view for each of the remotely accessible surveillance videos on the interactive map;
receive, from an emergency call routing service, a request for geospatial physical location data for an emergency caller that called the emergency call routing service; and
when the geospatial physical location of the emergency caller positionally overlaps the one or more established geofenced areas, provide access to the surveillance video and output the geospatial physical location of the caller corresponding with the geofenced area to the emergency call routing service comprising providing the interactive map for the location site including the geospatial location of the caller and selectable icons corresponding to a remotely accessible surveillance video.

2. The system of claim 1, wherein the remotely accessible surveillance video is security video of the geospatial physical location.

3. The system of claim 1, where the remotely accessible surveillance video is provided by an IP camera.

4. The system of claim 1, wherein the one or more location sites comprise a building or grounds.

5. The system of claim 1, wherein providing access to the surveillance video and outputting the geospatial physical location of the caller corresponding with the geofenced area comprises providing a link to the accessible surveillance video.

6. The system of claim 1, wherein providing access to the surveillance video and outputting the geospatial physical location of the caller corresponding with the geofenced area comprise providing a pop open camera view.

7. The system of claim 1, wherein providing the geospatial physical location of the caller further comprises providing an altitude of the caller.

8. The system of claim 1, wherein the providing the geospatial physical location of the caller further comprises providing a room within a building/facility the caller is located.

9. The system of claim 1, wherein the server is further configured to:
register one or more geospatial physical location sites.

10. A system for providing video in support of emergency call location data, the system comprising:
an emergency call routing service configured to receive, process, and route emergency call; and an enhanced geospatial physical location service provider in communication with the emergency call routing service; the enhanced location service provided configured to:

establish one or more geofenced areas associated with one or more geospatial physical location sites having remotely accessible surveillance video where a geofenced area corresponds to a camera view of the remotely accessible surveillance video, wherein establishing one or more geofenced areas having remotely accessible surveillance video at a location site comprises:

providing an interactive map for the location site;

receiving placement of one or more selectable icons on the interactive map corresponding to a remotely accessible surveillance video; and establishing a geofenced area corresponding to a camera view for each of the remotely accessible surveillance videos on the interactive map;

receive, from an emergency call routing service, a request for geospatial physical location data for an emergency caller that called the emergency call routing service; and when the geospatial physical location of the emergency caller positionally overlaps the one or more established geofenced areas, provide access to the surveillance video and output the geospatial physical location of the caller corresponding with the geofenced area to the emergency call routing service comprising providing the interactive map for the location site including the geospatial location of the caller and selectable icons corresponding to a remotely accessible surveillance video.

11. A method for providing video in support of emergency call location data, the method comprising:

establishing one or more geofenced areas associated with one or more location sites having remotely accessible surveillance video where a geofenced area corresponds to a camera view of the remotely accessible surveillance video, wherein establishing one or more geofenced areas having remotely accessible surveillance video at a location site comprises:

providing an interactive map for the location site;

receiving placement of one or more selectable icons on the interactive map corresponding to a remotely accessible surveillance video; and establishing a geofenced area corresponding to a camera view for each of the remotely accessible surveillance videos on the interactive map;

receiving, from an emergency call routing service, a request for geospatial physical location data for an emergency caller that called the emergency call routing service; and when the geospatial physical location of the emergency caller positionally overlaps the one or more established geofenced areas, providing, access to the surveillance video and outputting the geospatial location of the caller corresponding with the geofenced area to the emergency call routing service comprising providing the interactive map for the location site including the geospatial location of the caller and selectable icons corresponding to a remotely accessible surveillance video.

12. The method of claim 11, wherein the remotely accessible surveillance video is security video of the geospatial physical location.

13. The method of claim 11, where the remotely accessible surveillance video is provided by an IP camera.

14. The method of claim 11, wherein the one more geospatial physical location sites comprise a building or grounds.

15. The method of claim 11, wherein providing access to the surveillance video and outputting the geospatial physical location of the caller corresponding with the geofenced area comprises providing a link to the accessible surveillance video.

16. The method of claim 11, wherein providing access to the surveillance video and outputting the geospatial physical location of the caller corresponding with the geofenced area comprise providing a pop open camera view.

17. The method of claim 11, wherein providing the geospatial physical location of the caller further comprises providing an altitude of the caller.

18. The method of claim 11, wherein the providing the geospatial physical location of the caller further comprises providing a room within a building/facility the caller is located.

19. The method of claim 11, further comprising:

registering one or more geospatial physical location sites.

* * * * *